US012670031B2

(12) United States Patent
Regge et al.

(10) Patent No.: US 12,670,031 B2
(45) Date of Patent: Jun. 30, 2026

(54) EFFICIENT PLACEMENT OF SERVERLESS WORKLOADS ON TRANSIENT INFRASTRUCTURE ON POLICY-DRIVEN RE-LOCATION

(71) Applicant: INTERNATIONAL BUSINESS MACHINES CORPORATION, Armonk, NY (US)

(72) Inventors: Enrico Regge, Stuttgart (DE); Michael Beck, Bad Teinach-Zavelstein (DE); Werner Schuetz, Nufringen (DE); Peter Gerstl, Holzgerlingen (DE); Simon Daniel Moser, Gärtringen (DE); Sugandha Agrawal, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 17/934,249

(22) Filed: Sep. 22, 2022

(65) Prior Publication Data

US 2024/0103923 A1 Mar. 28, 2024

(51) Int. Cl.
*G06F 9/50* (2006.01)
*H04L 67/568* (2022.01)

(52) U.S. Cl.
CPC ............ *G06F 9/505* (2013.01); *G06F 9/5038* (2013.01); *H04L 67/568* (2022.05); *G06F 2209/503* (2013.01); *G06F 2209/506* (2013.01)

(58) Field of Classification Search
None
See application file for complete search history.

(56) References Cited

U.S. PATENT DOCUMENTS 10,534,655 B1 * 1/2020 Kinney, Jr ............ G06F 9/5083
11,082,333 B1 8/2021 Lam
(Continued)

FOREIGN PATENT DOCUMENTS

CN 112579193 A 3/2021

OTHER PUBLICATIONS

"Transient Virtual Servers", IBM Cloud, Last Updated on May 19, 2021, 6 pgs.<https://cloud.ibm.com/docs/virtual-servers?topic=virtual-servers-about-vs-transient>.
(Continued)

*Primary Examiner* — S. Sough
*Assistant Examiner* — Selena Sabah Nahra
(74) *Attorney, Agent, or Firm* — Kelsey M. Skodje

(57) ABSTRACT

A computer-implemented method for executing a serverless workload on a transient infrastructure is disclosed. The method comprises receiving a request for executing a workload and at least one policy, selecting an infrastructure component of the transient infrastructure for an execution of the workload, wherein the transient infrastructure is implemented utilizing a plurality of geographically distributed computing nodes, and executing the workload on the transient infrastructure. Furthermore, the method comprises upon receiving an interfering event during the execution of the workload causing a stop of the workload execution, freezing the execution of the workload, storing intermediate results and statuses of the workload execution in a cross-domain storage system, terminating the execution of the workload, and continuing the workload execution using the intermediate results and under a constraint defined by the at least one policy.

20 Claims, 10 Drawing Sheets

(56)     References Cited

U.S. PATENT DOCUMENTS

| | | | | |
|---|---|---|---|---|
| 2011/0153824 | A1* | 6/2011 | Chikando | G06F 9/5088 |
| | | | | 718/100 |
| 2016/0224367 | A1* | 8/2016 | Raghu | G06F 9/45558 |
| 2019/0028552 | A1 | 1/2019 | Johnson, II | |
| 2019/0230189 | A1* | 7/2019 | Keller | H04L 67/1021 |
| 2020/0225983 | A1 | 7/2020 | Jung | |
| 2020/0382519 | A1* | 12/2020 | Barton | H04L 63/107 |
| 2021/0200527 | A1 | 7/2021 | Sanchez | |
| 2021/0218644 | A1 | 7/2021 | Mestery | |
| 2021/0357271 | A1* | 11/2021 | Widebrant | G06F 9/5066 |
| 2022/0114032 | A1 | 4/2022 | Guim Bernat | |
| 2022/0179684 | A1* | 6/2022 | Tsirkin | G06F 11/0772 |
| 2022/0229704 | A1* | 7/2022 | Guchhait | G06F 9/505 |
| 2022/0374276 | A1* | 11/2022 | Mitra | G06Q 30/0201 |
| 2022/0398515 | A1* | 12/2022 | McGuire | G06F 11/3428 |
| 2024/0012931 | A1* | 1/2024 | Yannuzzi | H04L 63/107 |

OTHER PUBLICATIONS

Hui, K., "Migrating Workloads Across AWS Regions with CloudEndure Migration", Advanced (300), Amazon EC2, CloudEndure Migration, Migration & Transfer Services, Technical How-To, Aug. 28, 2020, 11 pgs.

Mell, et al., "The NIST Definition of Cloud Computing", National Institute of Standards and Technology, Special Publication 800-145, Sep. 2011, 7 pages.

Yu, et al., "FaaSRank: Learning to Schedule Functions in Serverless Platforms", 2021 IEEE International Conference on Autonomic Computing and Self-Organizing Systems (ACSOS), Sep. 2021, 10 pgs., doi: 10.1109/ACSOS52086.2021.00023.

Patent Cooperation Treaty, "Notification of Transmittal of the International Search Report and the Written Opinion of the International Searching Authority, or the Declaration", International application No. PCT/EP2023/075673, Date of mailing: Dec. 21, 2023, International filing date: Sep. 18, 2023, 13 pgs.

Office Action Response to examiner's observations in the communication dated Jun. 30, 2025, Application No. 23772499.2, 5 pages.

* cited by examiner

100

| | |
|---|---|
| 102 | receiving a request for executing a workload ... |

| | |
|---|---|
| 104 | selecting an infrastructure component of the transient infrastructure |

| | |
|---|---|
| 106 | executing the workload on the transient infrastructure |

108    upon receiving an interfering event ......

| | |
|---|---|
| 110 | freezing the execution of the workload |

| | |
|---|---|
| 112 | storing intermediate results and statuses ... |

| | |
|---|---|
| 114 | terminating the execution of the workload |

| | |
|---|---|
| 116 | continuing the workload execution ... |

906  receiver 908  selector unit 910  execution unit 902
processor(s)

912  freezing module 914  interm. storage 904
memory 916  reactivation unit

1000

1004

1002

1008

1010

1012

1016

1006

1014

900

1022

1018

1020

1100

EFFICIENT PLACEMENT OF SERVERLESS WORKLOADS ON TRANSIENT INFRASTRUCTURE ON POLICY-DRIVEN RE-LOCATION

BACKGROUND

Field of the Invention

The invention relates generally to executing a serverless workload, and more specifically, to a computer-implemented method for executing a serverless workload on a transient infrastructure. The invention relates further to a placement system for executing a serverless workload on a transient infrastructure, and a computer program product.

Related Art

For some time now, the usage of cloud computing infrastructure—either public cloud or private cloud, or a hybrid model combining the two approaches—has become the norm for providing computing resources and services to end-users in enterprises and for other organizations. Instead of large in-house compute centers, enterprises use more flexible IT (information technology) infrastructure components provided by cloud computing providers. Many of the services used may have only a temporal character, that is, they may not be used permanently, but only on demand Such temporary resources, for example, virtual machines may be used under different service conditions, that is, technical and contractual frameworks, that is, service level agreements (SLA).

Cloud computing providers or cloud providers who provide computing capacity for arbitrary workloads face the challenge of operating data centers cost-effectively and efficiently. In the "classic" VM (virtual machine) provisioning world, customers would buy VMs that are guaranteed to exist for a certain, probably comparable length of time. In the "classic" VM provisioning world, customers would purchase VMs that are guaranteed to exist for a certain, probably comparably long time. From the cloud provider's perspective, this has the disadvantage that planning capacity and costs can be derived from the number of customers in VMs requested, as well as their lifetime. However, today's cloud-based computing models tend to be more flexible as customers do only one to pay for the capacity they really need which in trade used "pay-as-you-go" type of operation models. For a cloud provider, this means that planning capacity becomes much harder as the amount of capacity need it may very at a much broader range. Consequently, cloud providers tend to have more capacity available than actually needed to be able to serve peak demands. To cover periods of low demand, cloud providers have introduced the concept of transient workloads or transient VMs. Unlike traditional VMs, transient VMs are not guaranteed to stay with the customer after they are "loaned" or "borrowed", that is, the cloud provider reserves the right to discontinue its operation at any time, sometimes without any pre-warning. From a user perspective, this drawback is offset with a much lower price, that is, transient VM's provide a discount compared to traditional VMs, while they still provide the same set of technical features. To meet high capacity demands, cloud providers reserves the right to take back capacity from those transient VMs to be able to support requests for traditional VMs being operated under higher level SLAs.

From a customer perspective, the concept of transient VMs introduces even more flexibility as it offers comparably cheap computing power, but for workloads that do not require uninterrupted execution, for example, batch processing. On the other hand, customers use the guarantee to have their workloads run within a specific timeframe, which can complicate their planning and may require additional recovery or remediation efforts.

There are some disclosures related to a computer-implemented method for executing a serverless workload on a transient infrastructure. For example, document US 2019/0 028 552 A1 discloses systems and methods for managing a distributed network for function execution environments. In some examples, a functional router registers the plurality of execution end points on a catalog of execution end points and functions. Thereby, each of the plurality of execution and points includes a respective runtime environment capable of executing one or more functions. The functional router receives, from a client, a request to execute a particular function and, based on the request, can be released to a catalog for the particular function and execution endpoints associated with a particular function. Such functions may underlie predefined SLAs.

In addition, document U.S. Pat. No. 11,082,333 B1 describes various approaches with regard to allocating resources to an application having multiple application components, with at least one execution of one or more functions, and a serverless service architecture that allows identifying multiple routing path. Thereby, each routing path is associated with the same function service provided by one or more containers or serverless execution entities.

A disadvantage of known solutions may be that they all do not reflect the special conditions under which transient VMs are operated as well as the disadvantages resulting from the transient character of the VMs for the customers and/or users.

Therefore, it may be necessary to overcome these limitation, in particular to ensure that intermediate results from transient VMs are not lost entirely when a transient VM is abruptly terminated.

SUMMARY OF THE INVENTION

According to an aspect of the present invention, there is a method, computer program product and/or system for use with a first workload and a temporary infrastructure including a plurality of infrastructure components that performs the following operations (not necessarily in the following order): (i) implementing the temporary infrastructure by a plurality of geographically distributed computing nodes respectively representing the plurality of infrastructure components; (ii) receiving a request for executing the first workload; (iii) receiving a policy definition including a set of policy(ies); (iv) selecting a first computing node from the plurality of geographically distributed for executing the first workload, with the selection the temporary infrastructure including application of the set of policy(ies) to determine the identity of the first computing node; (v) executing the workload on a first temporary infrastructure component corresponding to the first computing node; (vi) during the execution of the first workload, detecting an occurrence of an interfering event that is causing a stop of the execution of the first workload; and (vii) responsive to the detection of the occurrence of the interfering event, freezing the execution of the workload.

According to one aspect of the present invention, a computer-implemented method for executing a serverless workload on a transient infrastructure may be provided. The method may comprise receiving a request for executing a workload and at least one policy, selecting an infrastructure component of the transient infrastructure for an execution of the workload, wherein the transient infrastructure is implemented utilizing a plurality of geographically distributed computing nodes, and executing the workload on the transient infrastructure.

Furthermore, the method may comprise upon receiving an interfering event during the execution of the workload causing a stop of the workload execution, freezing the execution of the workload, storing intermediate results and statuses of the workload execution in a cross-domain storage system, terminating the execution of the workload, and continuing the workload execution using the intermediate results and under a constraint defined by the at last one policy.

According to another aspect of the present invention, a placement system for executing a serverless workload on a transient infrastructure may be provided. The system may comprise a processor and a memory operatively coupled to the processor, wherein the memory stored program code portions, which when executed, enable the processor to receive a request for executing a workload and at least one policy, select an infrastructure component of the transient infrastructure for an execution of the workload, wherein the transient infrastructure is implemented utilizing a plurality of geographically distributed computing nodes, and execute the workload on the transient infrastructure.

Moreover, the processors may, upon receipt of an interfering event during the execution of the workload causing a stop of the workload execution, the processor may also be enabled to freeze the execution of the workload, store intermediate results and statuses of the workload execution in a cross-domain storage system, terminate the execution of the workload, and continuing execution of the workload using the intermediate results under a constraint defined by the at last one policy.

The proposed computer-implemented method for executing a serverless workload on a transient infrastructure may offer multiple advantages, technical effects, contributions and/or improvements:

The benefits may be at least two fold: Cloud computing providers may make resources available as transient infrastructure components that are not currently used and are not subject to specific SLAs under special conditions. Thus, available resources may be used in a more efficient way.

On the other side, those users who have non-time-sensitive workloads to run can leverage this excess capacity at attractive rates. Hence, a win-win condition may be created for both, the provider and the user.

Even if the provider may terminate the availability of the transient infrastructure, the user may still benefit from its temporal existence, because the workload may be executed on a subsequent transit infrastructure from the same or different cloud computing provider in the same or different region depending on the underlying one or more policies.

Furthermore, a parallel execution of the same workload with different start parameter values may be initiated without excessive SLAs. Furthermore, optimization routines used for a determination of the "best" transit infrastructure may be used by analyzing historic trend data collected from previous executions of workloads executed on different transient infrastructures.

Thereby, the storage of intermediate results and statuses as a byproduct of the execution of the workload on or in a transit infrastructure may be instrumental to not restart a workload on a different transient infrastructure if the current infrastructure would have been terminated. Instead, the workload may be continued using a sort of snapshot stored during certain points in time during the execution of the actual workload.

It is worthwhile mentioning the stability of the system. Since one has the intermediate result and statuses stored, this is also pretty helpful in conditions where there may be any disaster recovery required; for example, if a data center fails, one may spawn the application/workload to any other data center, thereby, reducing cost and making the system more efficient.

In the following, additional embodiments of the inventive concept—applicable for the method as well as for the system—will be described.

According to a preferred embodiment of the method, the transient infrastructure may be implemented—in particular, temporarily—as part of a cloud computing environment; one may add: operated by a cloud computing provider. Because of the temporary character of the transient infrastructure it may be stopped, that is, terminated or interfered—at any point in time. Such transient infrastructures are provided by different public cloud computing providers under different names, like, for example, "spot instance" or "transient instance". User organizations may use such virtual transient infrastructures components for those workloads which do not require delivering results in a predefined amount of time. In turn, the provisioning conditions may be advantageous for the user organizations, for example, comparably low prices. The disadvantage for the end-user organizations is that there is not any performance guarantee or other good SLA conditions. The advantage for the cloud computing providers may be in the fact that they can make available spot capacities and still achieve a certain margin on them.

According to one interesting embodiment, the method may also comprise receiving a plurality of sets of job run parameter values together with receiving the request for executing a workload; and executing the workload multiple times, wherein each execution instance is performed with another set, out of a plurality of sets of job run parameter values. Thereby, the job run parameter values represent a set of values required as input for the particular job. Thus, for example, a simulation with many different start parameters, that is, different job run parameter values, may be executed in parallel. As alternative example, a monthly payment application should be mentioned. Each instance of the transient infrastructure could receive a subset of the employee data to determine the monthly payment and tax data in parallel using different transient infrastructure components.

According to a preferred embodiment of the method, the interfering event, that is, the one causing the stopping the transient VM—may be caused by the at least one or more policies. For example, a new re attractive transient VM may appear elsewhere due to free capacity elsewhere. This may be combined with a policy defining that always the cheapest transient VM should be used.

According to another preferred embodiment of the method, one or more resources required for the execution of the workload in the transient infrastructure may be removed by an unforeseeable event. This may, for example, be the case if the provider may decide, for example, by an automated system—to provide the resources to a client (that is, customer) because of his contractual conditions (he simply pays more) or for technical reasons, for example, because the required resource became unavailable in another region (for example, system or network error) and the provider must fulfil the request of the other clients due to before agreed SLA definitions. In case of such an unexpected or unforeseeable event or in case of a policy condition (as exemplified in the previous paragraph) the statuses and intermediate results of the actual execution of the transient VM would normally be lost. But because of the special provisions of the concept proposed here, that is, the storage of intermediate results and statuses—this would not be the case.

According to a further advantageous embodiment of the method, the continuation of the workload execution may be performed using another transient infrastructure requesting the stored intermediate results and statuses of the workload execution from the cross-domain storage system. Hence, for the user working with transient VMs this process may be transparent, that is, invisible. The execution would be simple moved to another transient infrastructure (transient VM) and continue its operation with the stored intermediate results and statuses. This may cause some delays in the execution of the complete task. However, the advantages lay on hand.

According to an enhanced embodiment of the method, the 'freezing the execution of the workload' and the 'storing intermediate results and statuses' may be executed after receiving a 'reclaim-scheduled message'. The "reclaim-scheduled message" may be initiated by the provider just before terminating a transient VM in use by another user.

According to a useful embodiment, the method may also comprise determining a plurality of execution environments compatible with technical requirements for the workload, as well as the at least one policy, and upon determining only one execution environment compatible with the technical requirements for the workload as well as the at least one policy, placing the workload in the one determined execution environment. Hence, a decision between different execution options may be avoided, that is, a straightforward deployment may be started. Additionally, the requirements for the workload may be received together with the request or from a registry storing the requirement for a specific workload request.

According to another or alternatively useful embodiment, the method may also comprise:

Upon several execution environments fulfilling the technical requirements for the workload as well as the at least one policy, determining a score value for each of the fulfilling execution environments—especially under the viewpoint of different geographical regions—using the technical requirements for the workload as well as the at least one policy, and placing the workload in the execution environment having a best score value. The meaning of "best" may be predefined. This may optionally be determined dynamically—for example, depending on the workload type—or statically before starting the system or periodically.

According to a further developed embodiment, the method may also comprise using historic trends of the lifetime of transient VMs, for example, based on the timing (for example, hour of the day, day in a week, day in a month, . . . ) for a determination of the score value. Thus, the analysis can determine what percentage of transient VMs might succeeded to the end before being terminated and forced to another transient VM.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings:

FIG. 1 shows a block diagram of an embodiment of the inventive computer-implemented method for executing a serverless workload on a transient infrastructure.

Figures 2, 3, 4:
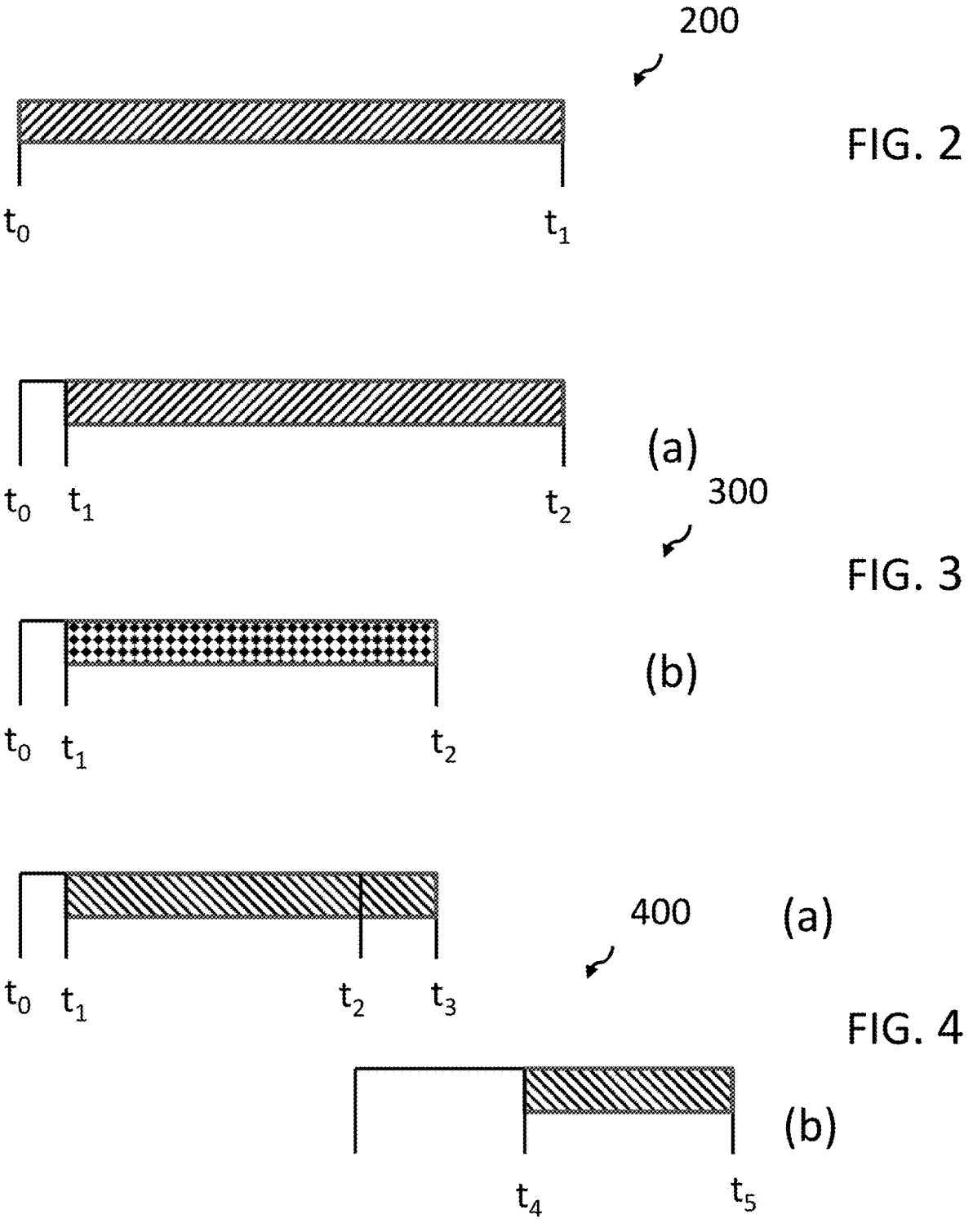

FIGS. 2 to 4 show block diagrams of how traditional and transient VMs relate to each other.

Figure 5:
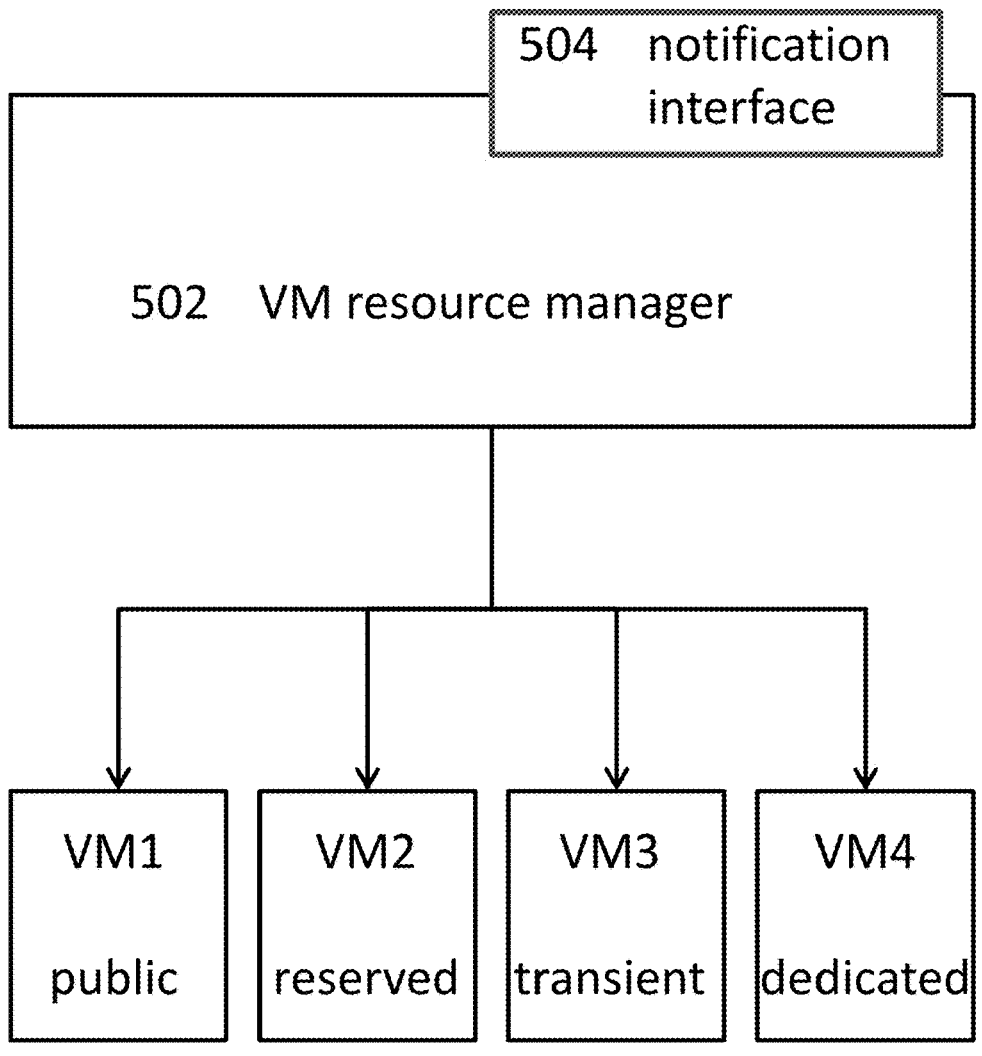

FIG. 5 shows a block diagram of an embodiment of a resource manager controlling VMs, especially transient VMs.

Figure 6:
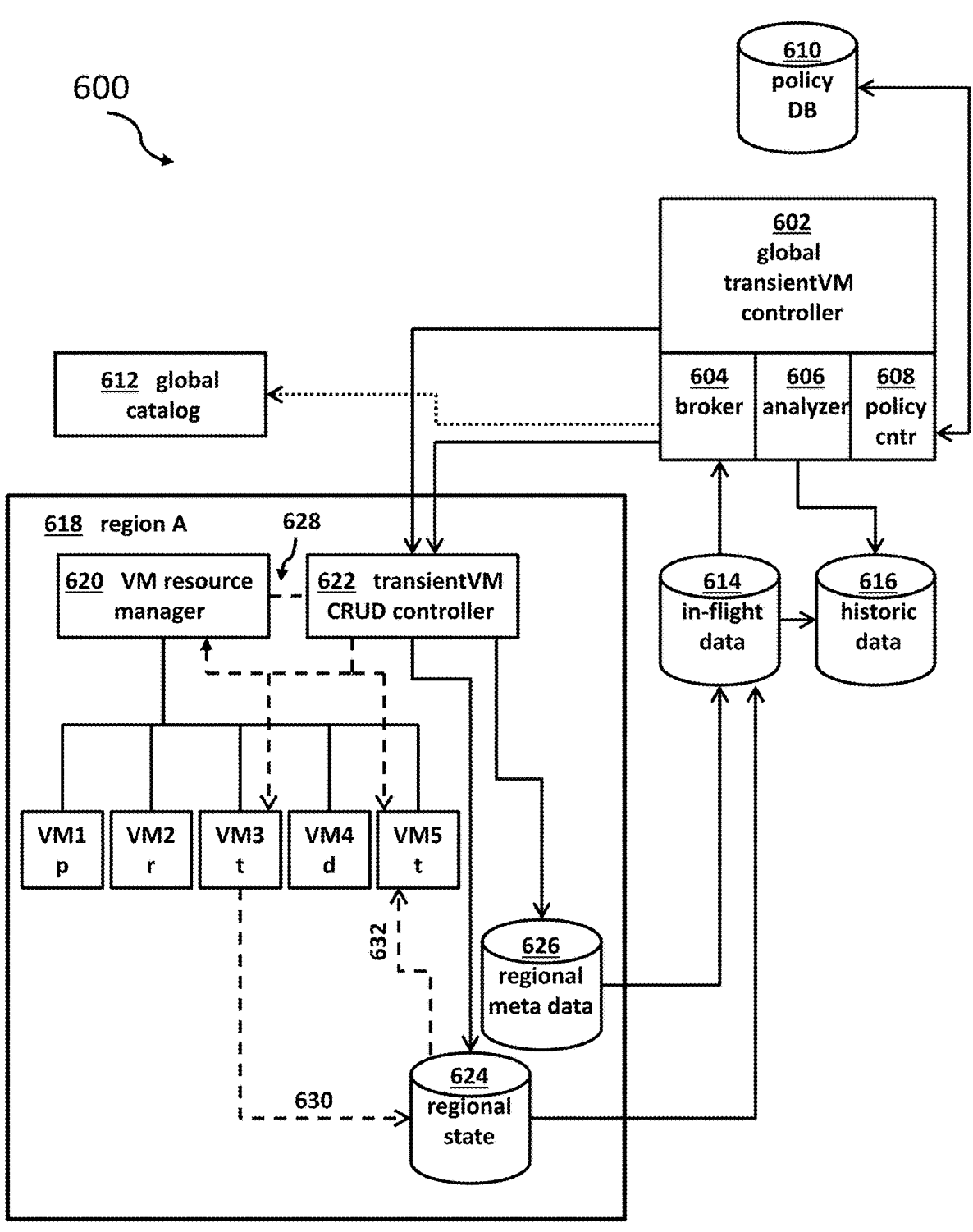

FIG. 6 shows a more implementation-near embodiment and its components.

Figure 7:
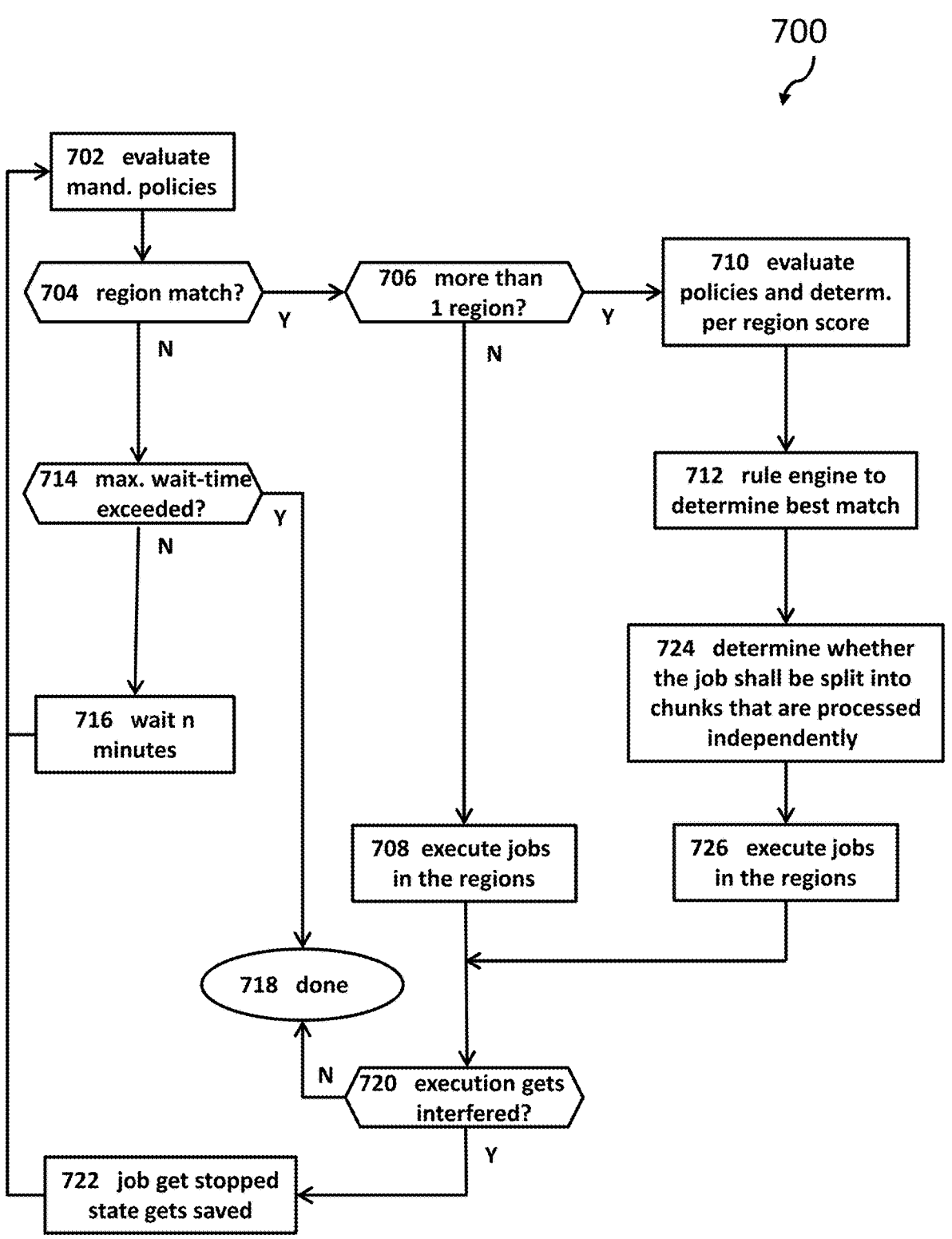

FIG. 7 shows a block diagram of a flow chart of an embodiment for a placement flow.

Figure 8:
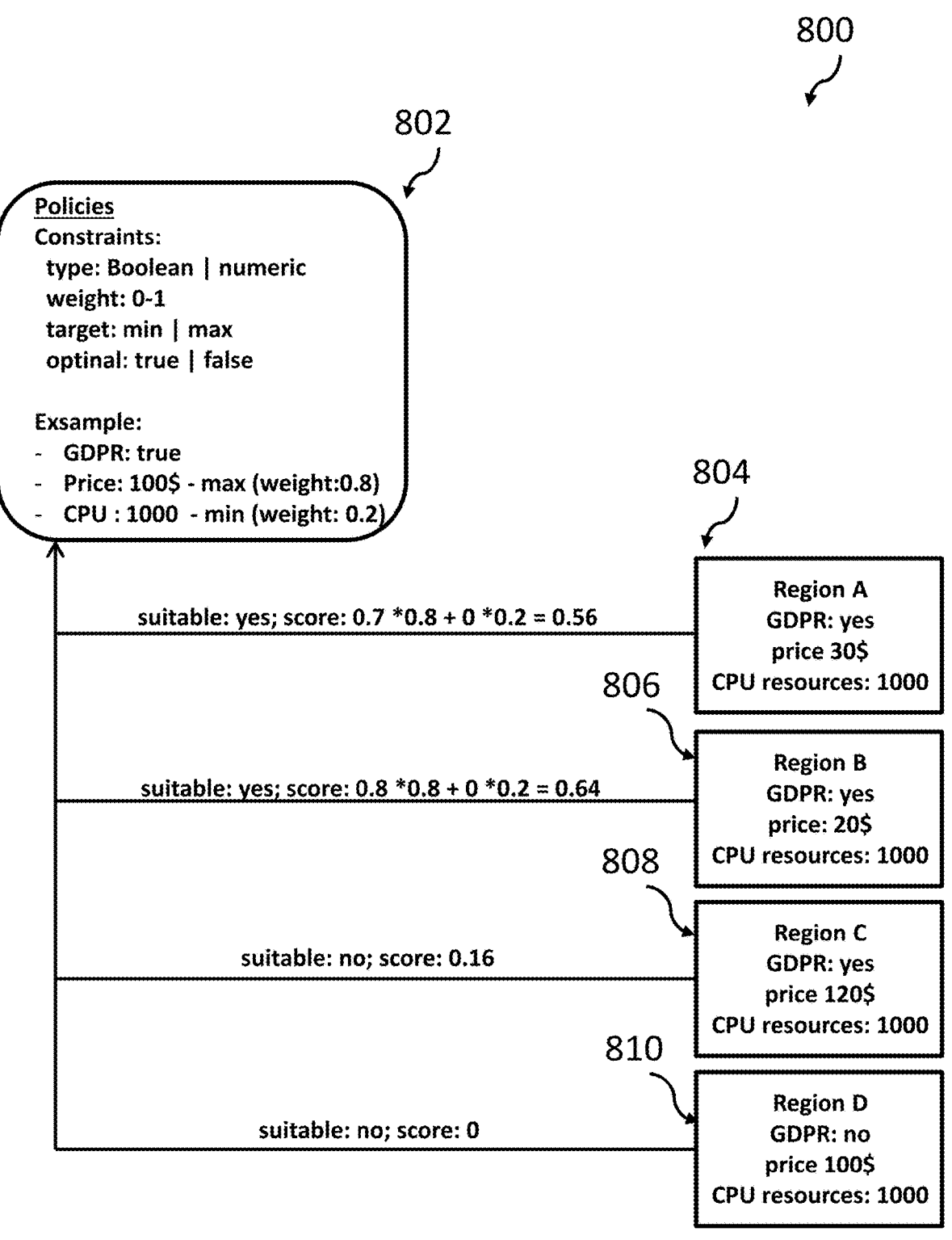

FIG. 8 shows a block diagram of an embodiment for policy scoring.

Figure 9:
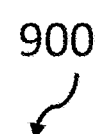

FIG. 9 shows a block diagram of an embodiment of the inventive placement system for executing a serverless workload on a transient infrastructure.

Figure 10:

FIG. 10 shows an embodiment of a computing system comprising the system according to FIG. 9.

Figure 11:
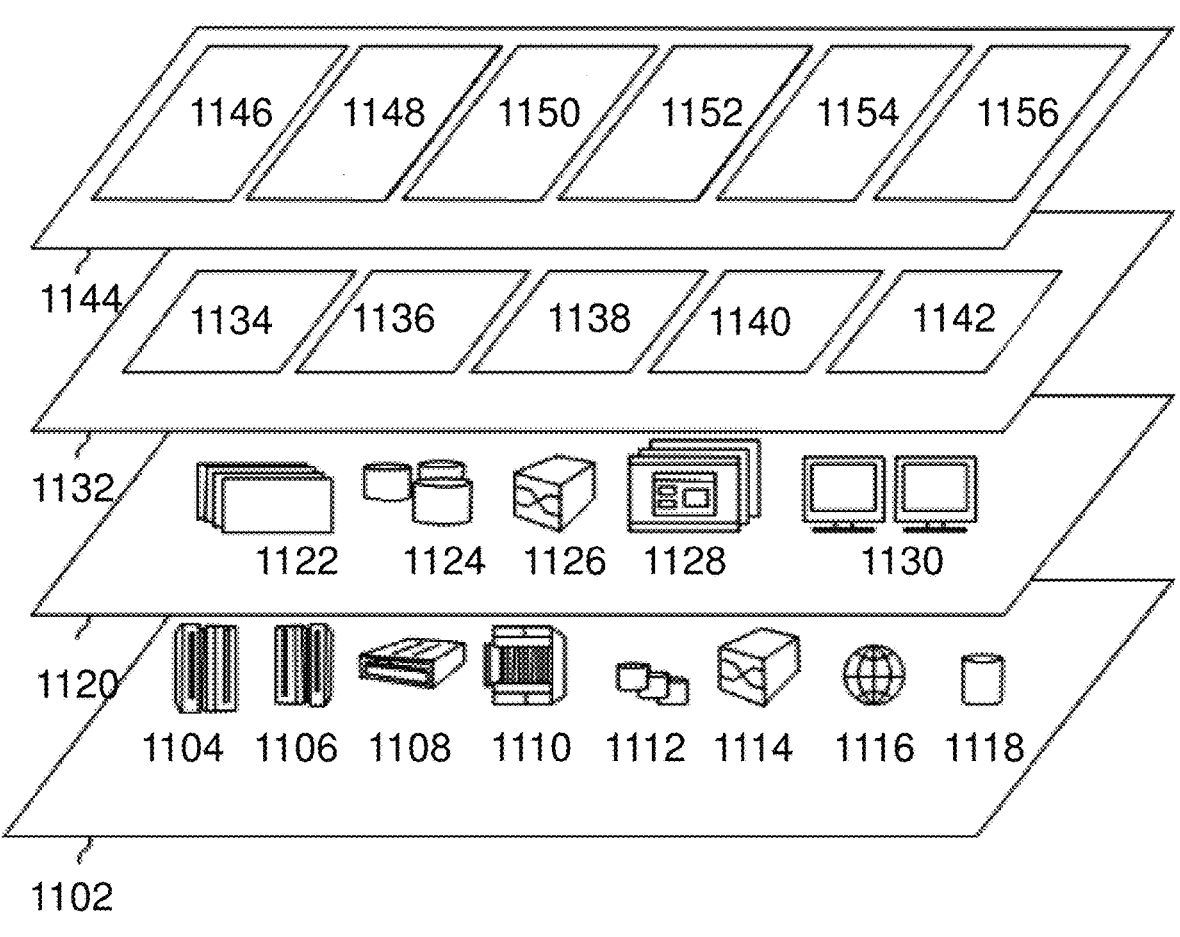

FIG. 11 shows a cloud computing environment in which at least parts of the inventive concept may be deployed.

Figure 12:
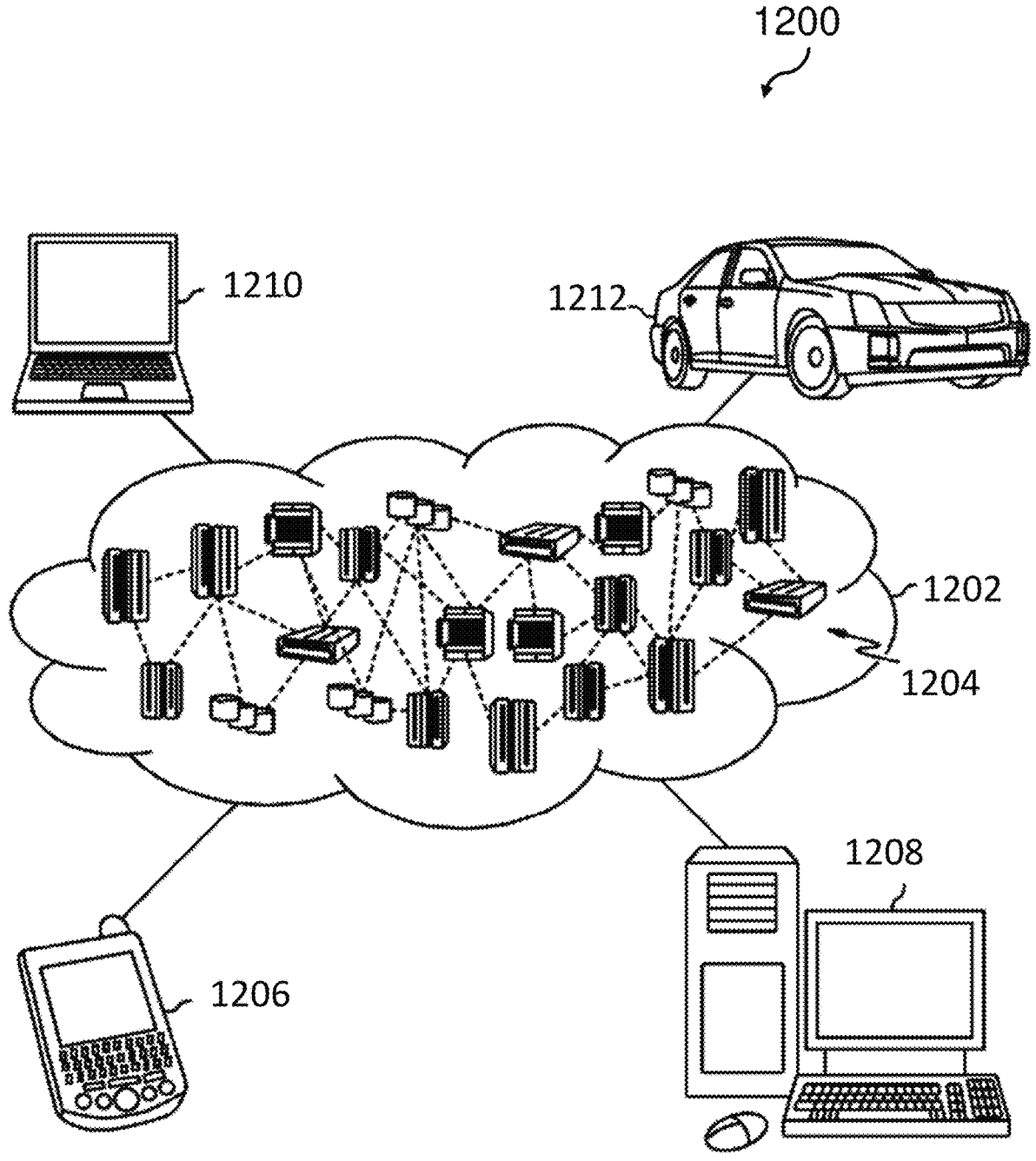

FIG. 12 shows components of an example of a cloud computing environment.

DETAILED DESCRIPTION

In the context of this description, the following technical conventions, terms and/or expressions may be used:

The term 'serverless workload' may denote a computer job where the user does not need to take care of, operate or maintain the required technical infrastructure when the workload is processed. The user may completely focus on the workload and "forget about the infrastructure".

The term 'transient infrastructure' may denote mainly virtual machines of virtual infrastructures being made available on an as-available basis from cloud computing providers. Thereby, the transient infrastructure components may be terminated by the provider with or without any pre-warning and/or delay. This may represent a risk for a user. However, this characteristic may be counterbalanced by storing intermediate results and statuses during the execution of the workload on the transient infrastructure, according to the here proposed concept. The workload may thus be continued without major disadvantages since the stored intermediate results and statuses can be used as starting points for a resource execution on a different transit infrastructure.

The term 'request for executing a workload' may denote a message requesting a specific type of workload with an accompanying set of workload parameters and start values or job parameter values. Additionally, the workload may be accompanied with one or more policies under which the workload should be executed.

The term 'policy' may denote a framework or framing conditions under which a specific workload should be executed. As an example, a geographical region were the data center providing the transit infrastructure components should be in a territory where GDPR (General Data Protection Regulation of the European Union) may have to be applied. Other regions may have other governmental or other regulations.

The term 'infrastructure component' may mainly denote a virtual machine or a virtual machine/application couple. Furthermore, also compute containers ("incomplete virtual machines") may be referred to as infrastructure component in the context of this text. However, it may be required that an accompanying virtual machine may also be part of the infrastructure component in question.

The term 'interfering event' may denote any type of interruption that may causes the transit infrastructure to be stopped, hibernated or terminated. Hence, it would no longer be available for the execution of the requested workload of a customer. The interfering event may have different root causes. On the one hand side, it may be provider initiated. For example, the resources may be required for a customer having higher valued SLAs. On the other hand side, it may be user-side driven, for example, based on a policy defining that always the most attractive (this may be definable or configurable) transient infrastructure shall be used for a specific workload.

The term 'intermediate results and statuses' may denote a sort of "snapshot" of a status of a workload during execution. These intermediate results and statuses may be used as starting points for a continuation of the workload (or a copy thereof) in a different infrastructure environment. The intermediate results and statuses may be captured at trigger points during the execution of the workload or at equally departed time points.

The term 'cross-domain storage system' may denote a permanent memory system providing the capability to store intermediate results and statuses of workloads and make them available on request at a later point in time. The cross-domain storage system may either be operated "in-house" by the user or may be provided as part of a cloud computing environment.

The term 'job run parameter value' may denote a value required as input for a certain workload or job to be executed.

The term 'unforeseeable event' may denote any event causing a stop of a transient infrastructure because the underlying physical resources may be needed for other purposes.

The term 'cloud computing'— and equivalently the more specific term 'cloud computing environment'— may in this context be interpreted as a model for enabling convenient, on-demand network access to a shared pool of configurable computing resources (for example, networks, servers, storage, applications, and services, that is, collectively denoting execution environments) that can be rapidly provisioned and released with minimal management effort or service provider interaction. This cloud model promotes availability and is composed of at least five essential characteristics, three service models and four deployment models.

Essential characteristics of cloud computing comprise:

(i) On-demand self-service. A consumer can unilaterally provision computing capabilities, such as server time and network storage, when needed automatically without requiring human interaction with each service provider.

(ii) Broad network access. Capabilities are available over the network and accessed through standard mechanisms that promote use by heterogeneous thin or thick client platforms (for example, mobile phones, laptops, and PDAs (personal digital assistants)).

(iii) Resource pooling. The provider's computing resources are pooled to serve multiple consumers using a multi-tenant model with different physical and virtual resources, dynamically assigned and reassigned according to consumer demand There is a sense of location independence in that the customer generally has no control or knowledge over the exact location of the provided resources, but may be able to specify location at a higher level of abstraction (for example, country, state, or datacenter). Examples of resources include storage, processing, memory, network bandwidth and virtual machines.

(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured Service. Cloud systems automatically control and optimize resource use by leveraging a metering capability at some level of abstraction appropriate to the type of service (for example, storage, processing, bandwidth, and active user accounts). Resource usage can be monitored, controlled and reported providing transparency for both, the provider and consumer of the utilized service.

Service models for cloud computing use comprise:

(i) Cloud Software as a Service (SaaS). The capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (for example, host firewalls).

Deployment models for cloud computing comprise:

(i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (for example, mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services.

(iv) Hybrid cloud. The cloud infrastructure is a composition of two or more clouds (private, community, or public) that remain unique entities but are bound together by standardized or proprietary technology that enables data and application portability (for example, cloud bursting for load-balancing between clouds).

It may be noted that cloud software can take full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the inventive computer-implemented method for executing a serverless workload on a transient infrastructure is given. Afterwards, further embodiments, as well as embodiments of the placement system for executing a serverless workload on a transient infrastructure will be described.

FIG. 1 shows a block diagram of a preferred embodiment of the computer-implemented method 100 for executing a serverless workload, that is, a virtual machine (VM) or also a computing container with a surrounding VM—on or in or by a transient infrastructure. The method 100 receiving, 102, a request for executing a workload and at least one policy, and selecting, 104, an infrastructure component of the transient infrastructure for an execution of the workload, wherein the transient infrastructure is implemented utilizing a plurality of geographically distributed computing nodes, or more generally, cloud computing centers.

The method 100 may also comprise executing, 106, the workload on the transient infrastructure. Then, upon receiving, 108, an interfering event during the execution of the workload causing a stop, that is, an abort, a halt, a termination in a non-recoverable mode—of the workload execution, freezing, 110 the execution of the workload, storing, 112, intermediate results and statuses of the workload execution in a cross-domain (or cross-region) storage system, terminating, 114, the execution of the workload, and continuing, 116, the workload execution using the intermediate results and under a constraint defined by the at least one policy.

Thereby, the cross-domain storage system should be available for an access by all nodes of all infrastructure providers providing transient infrastructure components. Furthermore, the at least one policy used for the continuation of the workload execution may be the same or different one, because the workload may be executed in a different geographical region were different technical and legal conditions may apply. Thus, the policy may be made time-dependent and geographic-territory-dependent.

FIGS. 2 to 4 show block diagrams 200, 300, 400 of how traditional and transient VMs relate to each other. FIG. 2 shows the case of a traditional VM where the execution of the workload has been processed properly between t0 and t1.

FIG. 3(*a*) shows a "good case" of an execution of a workload in a transient infrastructure environment between t1 and t2. It may not be required that the workload starts already at the time of initial availability of the transient infrastructure component, namely t0.

The corresponding "bad case" is shown in FIG. 3(*b*). Here, the workload would not be executed until its natural end but would be interrupted by an unforeseeable event at t2. Hence, no execution would be made for those instructions between t2 and t3.

This brings us to the inventive concept illustrated by FIG. 4(*a*). This diagram shows again a bad case for an execution of a workload to a transient infrastructure environment. The execution of statements between t2 and t3 was not possible because of an unforeseeable event. Hence, the execution of the workload was interrupted because, for example, the provider has reclaimed the required resources. However, the execution of the workload can be continued on a new transient VM between t4 and t5, FIG. 4(*b*), also using a request for the stored intermediate results statuses of the previously executed transient VM. Hence, the customers workload has also be processed properly although "only" transient infrastructure components have been used.

FIG. 5 shows a block diagram 500 of an embodiment of a resource manager controlling VMs, especially transient VMs. A plurality of VM, for example, VM1 VM2, VM3, VM4 are controlled by the VM resource manager 502. This may also comprise a notification interface 504. The VMs may come in different "flavors", like public (for example, available to everybody), reserved (for example, for special purposes), transient (as defined above) and, dedicated (for example, for a customer). Hence, the VM resource manager 502 manages or controls an execution of jobs on the different VMs as instructed via the notification interface 504.

FIG. 6 shows a more implementation-near embodiment 600 and its components. A controlling element for the concept proposed here is the global transientVM controller 602. It comprises at least the broker 604, the historic data analyzer 606 and the policy controller 608. The last component interfaces with the policy database 610 defining under which conditions a certain job for workload has to be executed. Here, a large variety of different conditions may be defined, like, the job should be run when the unit price of a transient VM is within a predefined range (for example, $1-$2 per hour for CPU (central processing unit) usage) or a pre-defined completion time (for example, before 2022-11-20 14:00 UTC (coordinated universal time)) or the job must be executed in EU (European union)-regional/compliant data centers; just to name a few.

It should also be mentioned that the global transientVM controller 602 comprises a decision logic to pause, resume, re-locate and/or create jobs, as well as determining to execute a job instance in an efficient (cost/performance) manner by respecting the requirements that are given by the policy and the system status (for example, distribution across various regions based on job policies). Thereby, the broker component 604 of the global transientVM controller 602 has access to a global catalog 612 of service or workload definitions from which it may select the one for which the global transientVM controller 602 has received a service request.

The broker component 604 receives also in-flight data from the in-flight data storage 614 of current executions of workloads, which data may, at least partially, also be stored in the historic data system 616. The historic data analyzer 606 may access the historic data storage 616 for a determination where to best place a request for a transient infrastructure for a predefined workload on the predefined conditions (for example, time, location, territory and, other interdependencies).

Furthermore, FIG. 6 shows components available in a geographical region, for example, region A 618. Here, the VM resource manager 620 (already known from FIG. 5 as 502) is active controlling the different VMs, namely, for example, the VM1, VM2, VM3, VM4 and VM5 with its different characteristics (p=public, r=reserved, t=transient, d=dedicated).

As new component, if compared to a traditional environment, the transient VM CRUD (create-read-update-delete) controller 622 becomes active. It is an information exchange with the VM resource managers 620 and receives requests from the global transientVM controller 602 as well as the related broker 604. Although the VM resource manager 620 manages the transient VMs VM3 and VM5, also an information exchange between the transientVM CRUD controller 622 and the transient VMs exists. This is required for a storage of the intermediate results and statuses.

For this, the transient VMs push their state into the regional state data store 624; and on request, the status is read delivered to a new transient VM, for example, transient VM5 for a continuation of a workload which was unexpectedly interrupted, for example, VM3. For this scenario, the broker 604 under the control of the global transientVM controller 602 triggers a re-placing of the workload on the new transient VM based on, for example, respective metadata changes and other conditions, like identical or adopted policies (for example, due to a different territory in which the new transient VM is executed).

Furthermore, the transient VM CRUD controller 622 makes regional metadata available to the regional metadata store 626 from which respective data may be transitioned to the in-flight data storage 614. Furthermore, the in-flight data storage 614 can also receive respective data from the regional state storage 624. Thereby, the in-flight data storage 614 should be accessible across different regions or domains. This may be facilitated by a request of the global transientVM controller 602 to the in-flight data storage 614.

In order to differentiate the traditional environment from the new concept proposed here, the newly required components to achieve the described advantage are at least as follows: the global transientVM controller 602 with its respective sub-components, the policy DB 610, the transientVM CRUD controller 622, the regional state data store 624, the regional metadata store 626, the in-flight data store 614 and, the stored historic data 616.

The following sequence—with a differentiation characteristic is shown as dashed lines in comparison to traditional control flows—shall illustrate in short the sequence of activities:

(1) after a reception of a reclaim notification 628, (2) the transient VM CRUD controller 622 alerts to the respective transient VM3 and triggers a state saving procedure for (3) storing, that is, pushing—intermediate results and statuses, 630;

(4) once a new transient VM— here, VM5— has been identified, it pulls, 632, the state, that is the stored intermediate results and statuses, from the regional state storage 624; and (5) hence, the transientVM CRUD controller 622 cares about the additional transientVM set up, that is, VM5.

In other words, the concept proposed here introduces a system and method that leverages a transient infrastructure as a base concept, allowing a much more dynamic redistribution of running workloads to regions in order to react to infrastructure constraints, outages, peak demands, etc., while being constrained by user-defined requirements like GDPR compliant data processing. A set of controllers (reference FIG. 6) is introduced to accomplish this. In order to render the proposed concept more comprehensively, the following use-cases can be considered:

(1) A customer requires a computing job to be finished within, for example, 24 hours. The controller of the concept proposed here is aware of degraded performance, ongoing outages, persistent failures or shortages of the regular capacity in the selected region and decides to pause/stop, preserve its state and resume the execution and one or more different regions. Thereby, a region may be a geographical region where a related cloud computing center is located.

(2) The cloud computing provider operating the transient infrastructures decides to introduce larger discounts to infrastructure resources (for example, VMs) in a region or during a given timeframe (usually, to boost utilization numbers in a given region). The proposed global transientVM controller (reference FIG. 6, 602) reacts on the dynamic pricing model and ensures that compute jobs are placed in a cost-effective manner based on a customer defined rule or policy (for example, my job must run if the unit price is below xS or, if a reliability of the computing center is above y % or, if the probability of getting the computer done without interruption is above z %). This also includes that the cloud computing provider decides to run parts of the workload in different regions to overcome capacity shortages or optimize the utilization of its resources across regions.

(3) External circumstances (for example, the UK (United Kingdom)) leaving the EU (European Union)) give way the imposition of an embargo on a region (the workload is no longer "EU compliant"). This is a policy update that would be recognized by the controller and would trigger moving right workloads into other regions or data centers on a short notice and automatically.

(4) A customer wants to process workloads in the most cost-effective way, while he expects that the duration or performance takes way longer than on a non-transient infrastructure. The global transientVM controller would automatically move the workload around according to the customer specific policies.

(5) The controller is capable of analyzing historic data in order to detect certain workload patterns (for example, every night at 3 AM large amounts of the system is occupied) and takes actions to prevent capacity shortages of overload by pro-actively placing computation jobs in other regions.

Technically, all of the above have in common a system that has the following properties:

(i) supervising the capacity in the cloud computing data centers at any point in time;

(ii) a notification system that triggers an event when a cloud data sent in a region does not have much "free capacity" left and initiates a special offer for freeing capacities;

(iii) a management system for batch jobs in particular to manage regional scheduling jobs, freezing of jobs, relocation of jobs, unfreezing jobs, and so on;

(iv) a cross-regional (or cross-domain) data store to allow transferring workloads in case a job needs to get transferred into a different region;

(v) a day or store to manage and maintain policies which can define the constraints for any workload execution; and (vi) a data store to persist historic data and an analyzer that takes execution patterns.

In order to continue the use-cases described above, the scenario would continue as follows:

According to the policy of an exemplary running job, it must be finished, for example, within the next 24 hours, as an example. The global transientVM controller is aware of performance degradations, an ongoing outage, or a lack of regular capacities in the selected region and decides to pause and resume the execution of the workload in another region.

Next, the cloud computing provider—or a related, automated system—decides to introduce a larger discount for VMs in regions (or timeframes) in which the mind is not as high as in others (at the same time). Then, the controller reacts on the dynamic pricing model and ensures that jobs are placed in a cost-effective manner (according to for example, my job must run if the unit price is below x).

A new policy update (for example, embargo of a certain region) requires moving running workloads into other regions or data centers on a short notice. As a user, one wants to process the not-critical workloads in the most cost-effective way, while it is accepted that the duration (or performance) takes way longer than using a regular VM.

Historic data may be unveiled that certain workload patterns (for example, every night at 3 am in Dallas) are occupying large amounts of the available systems so that the global transientVM controller takes measures to prevent capacity shortages of overloads by pro-actively placing jobs in other regions. Thus, the instances of a large job (equivalent to many instances) are processed across several regions to overcome capacity and cost restrictions using the forward-looking insights extracted from the historic data.

An exemplary flow 700 of activities may be described as follows and in the context of FIG. 7 which shows a block diagram of a flow chart of an embodiment for a placement flow.

A request for a job and potentially also N associated job runs are received from the global transientVM controller.

The global transientVM controller checks the policy associated with the submitted job and the associated job runs completion state, 702.

The global transientVM controller "LOOP OVER" the regions, 704, to find out whether one or more of the resources available in the regions can fulfill the required policies, 706.

For every policy listed in the set of mandatory and optional policies (for example, GDPR [mandatory], prize [optional], completion time [optional]), the region will return a Boolean value whether it can fulfill an individual policy.

The global transientVM controller checks if at least one mandatory policy is not TRUE. If so, the region is removed from the list of potential region targets.

If exactly one region is found, the job is placed into this region, 708.

If more than one region is found, the mandatory and/or optional policies are evaluated to determine a score, 710. Each policy constraint will be evaluated by determining a score based on the given target value, the distance that the cloud provider can guarantee and the weight, which is then used to rank regions and find the best fit for a certain workload request, 712.

If no policy compliant region is found, the process gets paused and re-entered after some wait time (for example, five minutes), 714, 716.

The (remainder of the) job is now running in a specific region.

If the job is finished without interference or interruption, the process ends, 718.

Otherwise (else) the interfering event occurs, 720 (for example, capacity in the region gets removed, prize for the resources of the region gets changed, and so on), yielding either to a policy violation or an improvement (for example, if the price in another region gets much cheaper).

The job gets stopped/frozen and the intermediate resides and statuses are stored in the regional state data store (and replicated to the in-flight data store, referenced above), 722.

Then, the process loops back for receiving a request for a job and the evaluation of the mandatory policies, 702.

It shall also be noticed that after the rules engine has attempted to find/determine a best match, 712, it can be determined whether the job shall be split into chunks that are processed independently in parallel and in different regions, 724. The related quasi-parallel jobs are then executed in the regions, 726.

FIG. 8 shows a block diagram of an example for policy scoring 800. The figures are more or less self-explanatory, but a few remarks should be made. Block 802 shows examples of constraints that may be defined in the upper part, whereas the lower part of block 802 shows examples, for example, "GDPR: true".

On the lower right side of the figure, actual settings of different regions A, B, C, D are shown as 804, 806, 808 and 810. It is easily comprehensible that the conditions in the different regions are different as shown by the different variables, for example, region A, B and C work according to GDPR rules, whereas region D does not ("GDPR: no"). It is also shown that the pricing for the available CPU resources (all set to "1000") is different: $30 versus $20 versus $120 versus $100.

Hence, the suitability for the regions shows a "yes" for regions A and B with the determined score values of 0.56 and 0.64. Regions C and D are shown as being not suitable ("no"). In that case, also the score values—being 0.16 and zero—do not really matter.

FIG. 9 shows a block diagram of an embodiment of the inventive placement system for executing a serverless workload on a transient infrastructure. The system comprises a processor 902 and a memory 904 operatively coupled to the processor, wherein the memory 904 stores program code portions, which, when executed enable the processor 902 to receive—for example, by a receiver 906—request for executing a workload and at least one policy, to select—for example, by a selector unit 908—an infrastructure component of the transient infrastructure for an execution of the workload, wherein the transient infrastructure is implemented utilizing a plurality of geographically distributed computing nodes, and to execute—for example, by an execution unit 910—the workload on the transient infrastructure.

Upon a reception of an interfering event during the execution of the workload causing a stop of the workload execution, the processor is also enabled to freeze—for example, by a freezing module 912—the execution of the workload, to store—for example, by an intermediate storage system 914 (for example, the region state store, reference FIG. 6, 624)—intermediate results and statuses of the workload execution in a cross-domain storage system, terminate the execution of the workload, and to continue—for example, by a reactivation unit 916—the workload execution using the intermediate results and under a constraint defined by the at last one policy.

It shall also be mentioned that all functional units, modules and functional blocks—in particular, the receiver 906, the selector unit 908, the execution unit 910, the freezing module 912, intermediate storage system 914, the reactivation unit 916—may be communicatively coupled to each other for signal or message exchange in a selected 1:1 manner. Alternatively, the functional units, modules and functional blocks can be linked to a system internal bus system 918 for a selective signal or message exchange.

Embodiments of the invention may be implemented together with virtually any type of computer, regardless of the platform being suitable for storing and/or executing program code. FIG. 10 shows, as an example, a computing system 1000 suitable for executing program code related to the proposed method.

The computing system 1000 is only one example of a suitable computer system, and is not intended to suggest any limitation as to the scope of use or functionality of embodiments of the invention described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs (personal computers), minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (for example, a 'floppy disk'), and an optical disk drive for reading from or writing to a removable, non-volatile optical disk such as a CD-ROM (compact disc, read-only-memory), DVD-ROM (digital versatile disc-read only memory) or other optical media may be provided. In such instances, each can be connected to bus 1006 by one or more data media interfaces. As will be further depicted and described below, memory 1004 may include at least one program product having a set (for example, at least one) of program modules that are configured to carry out the functions of embodiments of the invention.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the invention, as described herein.

The computer system/server 1000 may also communicate with one or more external devices 1018 such as a keyboard, a pointing device, a display 1020, etc.; one or more devices that enable a user to interact with computer system/server 1000; and/or any devices (for example, network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (for example, the Internet) via network adapter 1022. As depicted, network adapter 1022 may communicate with the other components of the computer system/server 1000 via bus 1006. It should be understood that, although not shown, other hardware and/or software components could be used in conjunction with computer system/server 1000. Examples, include, but are not limited to: microcode, device drivers, redundant processing units, external disk drive arrays, RAID (redundant array of independent disks) systems, tape drives, and data archival storage systems, etc.

Additionally, the placement system for executing a serverless workload on a transient infrastructure 900 may be attached to the bus system 1006.

FIG. 11 shows a cloud computing environment 1100 in which at least parts of the inventive concept may be deployed. A set of functional abstraction layers provided by a cloud computing environment is shown. It should be understood in advance that the components, layers, and functions, shown in FIG. 11, are intended to be illustrative only, and embodiments of the invention are not limited thereto. As depicted, the following layers and corresponding functions are provided: Hardware and software layer 1102 include hardware and software components. Examples of hardware components include: mainframes 1104; servers 1106; RISC (Reduced Instruction Set Computer) architecture-based servers 1108; blade servers 1110; storage devices 1112; networks 1114 and networking components 1114. In some embodiments, software components include network application server software 1116 and/or database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130. In one example, management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfilment 1142 provides pre-arrangement for, and procurement of, cloud computing resources for which a future requirement is anticipated in accordance with an SLA.

Workload layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and the placement system 1156 for executing a serverless workload on a transient infrastructure (also reference FIG. 9, 900).

FIG. 12 shows components 1200 of a cloud computing environment 1202. As shown, cloud computing environment 1202 comprises one or more cloud computing nodes 1204 with which local computing devices used by cloud consumers, such as, for example, personal digital assistant (PDA) or cellular telephone 1206, desktop computer 1208, laptop computer 1210, and/or automobile computer system 1212 may communicate. Nodes 1204 may communicate with one another. They may be grouped (not shown) physically or virtually, in one or more networks, such as Private, Community, Public, or Hybrid clouds as described hereinabove, or a combination thereof. This allows cloud computing environment 1202 to offer infrastructure, platforms and/or software as services for which a cloud consumer does not need to maintain resources on a local computing device. It is understood that the types of computing devices 1204 shown in FIG. 12 are intended to be illustrative only and that computing nodes 1204 of the cloud computing environment 1202 can communicate with any type of computerized device over any type of network and/or network addressable connection (for example, using a Web browser).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD—ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, and they are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Definitions

Transient infrastructure/temporary infrastructure: transient infrastructure and temporary infrastructure shall be taken to mean the same thing; it is noted that the transient infrastructure discussed and claimed herein is not a transient signal, but rather a set of of data and/or code, such as a virtual machine (VM) that is typically stored and run from a set of volatile memory(ies).

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer implemented method (CIM) for use with a temporary infrastructure including a plurality of infrastructure components, the CIM comprising:

implementing the temporary infrastructure by a plurality of geographically distributed computing nodes respectively representing the plurality of infrastructure components;

maintaining a set of policies associated with geographical regions of the computing nodes;

receiving a request for executing a first workload;

receiving a policy definition including at least one policy associated with the first workload;

selecting a first computing node from the plurality of geographically distributed computing nodes for executing the first workload, wherein the first computing node is in a first geographical region, and wherein the selecting the first computing node comprises determining, based on the set of policies, that the at least one policy does not include a mandatory policy that cannot be fulfilled in the first geographical region;

executing the first workload on a first temporary infrastructure component corresponding to the first computing node;

during the execution of the first workload, detecting an occurrence of an interfering event that is causing a stop of the execution of the first workload;

responsive to the detection of the occurrence of the interfering event, freezing the execution of the first workload, storing a state of the first workload in a regional data store of the first geographical region, and replicating the state of the first workload to a cross-domain in-flight storage;

selecting, based on the policy definition and the set of policies, at least one additional computing node from the plurality of geographically distributed computing nodes, wherein the at least one additional computing node comprises a second computing node in a second geographical region; and in response to determining that the second computing node is not in the first geographical region, pulling the state of the first workload from the cross-domain in-flight storage to resume the first workload on the second computing node.

2. The CIM of claim 1, wherein the storing comprises:

storing an execution status data set including information indicative of a plurality of intermediate results and statuses of the execution of the first workload.

3. The CIM of claim 2, further comprising:

subsequent to the pulling the state of the first workload, continuing execution of the first workload on the second computing node using the execution status data set and under a constraint defined by the at least one policy.

4. The CIM of claim 1, wherein the temporary infrastructure is implemented as part of a cloud computing environment.

5. The CIM of claim 1, further comprising continuing the execution of the first workload on a temporary infrastructure component corresponding to the second computing node.

6. The CIM of claim 1, wherein the at least one additional computing node further comprises a third computing node in the first geographical region.

7. The CIM of claim 6, further comprising, in response to determining that the third computing node is in the first geographical region, pulling the state of the first workload from the regional data store.

8. The CIM of claim 1, wherein the maintaining the set of policies comprises updating the set of policies in response to detecting policy updates in the geographical regions.

9. The CIM of claim 8, wherein the interfering event is a policy update in the first geographical region.

10. The CIM of claim 1, further comprising executing the workload in parallel on at least two computing nodes selected from the first computing node and the at least one additional computing node.

11. The CIM of claim 1, wherein the interfering event is a price change for at least one of the geographically distributed computing nodes.

12. A computer program product (CPP) for use with a first workload and a temporary infrastructure including a plurality of infrastructure components, the CPP comprising:

at least one storage device; and computer code stored collectively in the at least one storage device, with the computer code including data and instructions to cause one or more processors to perform operations comprising:

implementing the temporary infrastructure by a plurality of geographically distributed computing nodes respectively representing the plurality of infrastructure components;

maintaining a set of policies associated with geographical regions of the computing nodes;

receiving a request for executing the first workload;

receiving a policy definition including at least one policy associated with the first workload;

selecting a first computing node from the plurality of geographically distributed computing nodes for executing the first workload, wherein the first computing node is in a first geographical region, and wherein the selecting the first computing node comprises determining that the at least one policy does not include a mandatory policy that cannot be fulfilled in the first geographical region;

executing the first workload on a first temporary infrastructure component corresponding to the first computing node;

during the execution of the first workload, detecting an occurrence of an interfering event that is causing a stop of the execution of the first workload;

responsive to the detection of the occurrence of the interfering event, freezing the execution of the first workload, storing a state of the first workload in a regional data store of the first geographical region, and replicating the state of the first workload to an in-flight storage that is accessible to more than one geographical region;

selecting, based on the policy definition and the set of policies, at least one additional computing node from the plurality of geographically distributed computing nodes, wherein the at least one additional computing node comprises a second computing node from the plurality of geographically distributed computing nodes, wherein the second computing node is in a second geographical region; and in response to determining that the second computing node is not in the first geographical region, pulling the state of the first workload from the in-flight storage that is accessible to more than one geographical region to resume the first workload on the second computing node.

13. The CPP of claim 12, wherein the storing the state comprises:

storing an execution status data set including information indicative of a plurality of intermediate results and statuses of the execution of the first workload.

14. The CPP of claim 13, wherein the computer code further includes instructions for causing the one or more processors to perform operations comprising:

subsequent to the pulling the state of the first workload, continuing execution of the first workload on the second computing node using the execution status data set and under a constraint defined by the at least one policy.

15. The CPP of claim 12, wherein the temporary infrastructure is implemented as part of a cloud computing environment.

16. A computer system (CS) for use with a first workload and a temporary infrastructure including a plurality of infrastructure components, the CS comprising:

one or more processors;

at least one storage device; and computer code stored collectively in the at least one storage device, with the computer code including data and instructions to cause the one or more processors to perform operations comprising:

implementing the temporary infrastructure by a plurality of geographically distributed computing nodes respectively representing the plurality of infrastructure components;

maintaining a set of policies associated with geographical regions of the computing nodes;

receiving a request for executing the first workload;

receiving a policy definition including at least one policy associated with the first workload;

selecting a first computing node from the plurality of geographically distributed computing nodes for executing the first workload, wherein the first computing node is in a first geographical region, and wherein the selecting the first computing node comprises determining that the at least one policy does not include a mandatory policy that cannot be fulfilled in the first geographical region;

executing the first workload on a first temporary infrastructure component corresponding to the first computing node;

during the execution of the first workload, detecting an occurrence of an interfering event that is causing a stop of the execution of the first workload;

responsive to the detection of the occurrence of the interfering event, freezing the execution of the first workload, storing a state of the first workload in a regional data store of the first geographical region, and replicating the state of the first workload to an in-flight storage that is accessible to more than one geographical region;

selecting, based on the policy definition and the set of policies, at least one additional computing node from the plurality of geographically distributed computing nodes, wherein the at least one additional computing node comprises a second computing node in a second geographical region; and in response to determining that the second computing node is not in the first geographical region, sending pulling the state of the first workload from the in-flight storage that is accessible to more than one geographical region to resume the first workload on the second computing node.

17. The CS of claim 16, wherein the storing the state comprises:

storing an execution status data set including information indicative of a plurality of intermediate results and statuses of the execution of the first workload.

18. The CS of claim 17, wherein the computer code further includes instructions for causing the one or more processors to perform operations comprising:

subsequent to the pulling the state of the first workload, continuing execution of the first workload on the second computing node using the execution status data set and under a constraint defined by the at least one policy.

19. The CS of claim 16, wherein the temporary infrastructure is implemented as part of a cloud computing environment.

20. The CS of claim 16, further comprising, in response to determining that the at least one additional computing node further comprises a third computing node in the first geographical region, pulling the state of the first workload from the regional data store.

\* \* \* \* \*